March 25, 1958 R. D. KAPLAN 2,828,093
CANOPY MECHANISM
Filed Feb. 10, 1954 5 Sheets-Sheet 1

INVENTOR.
Richard D. Kaplan
BY
ATTORNEY.

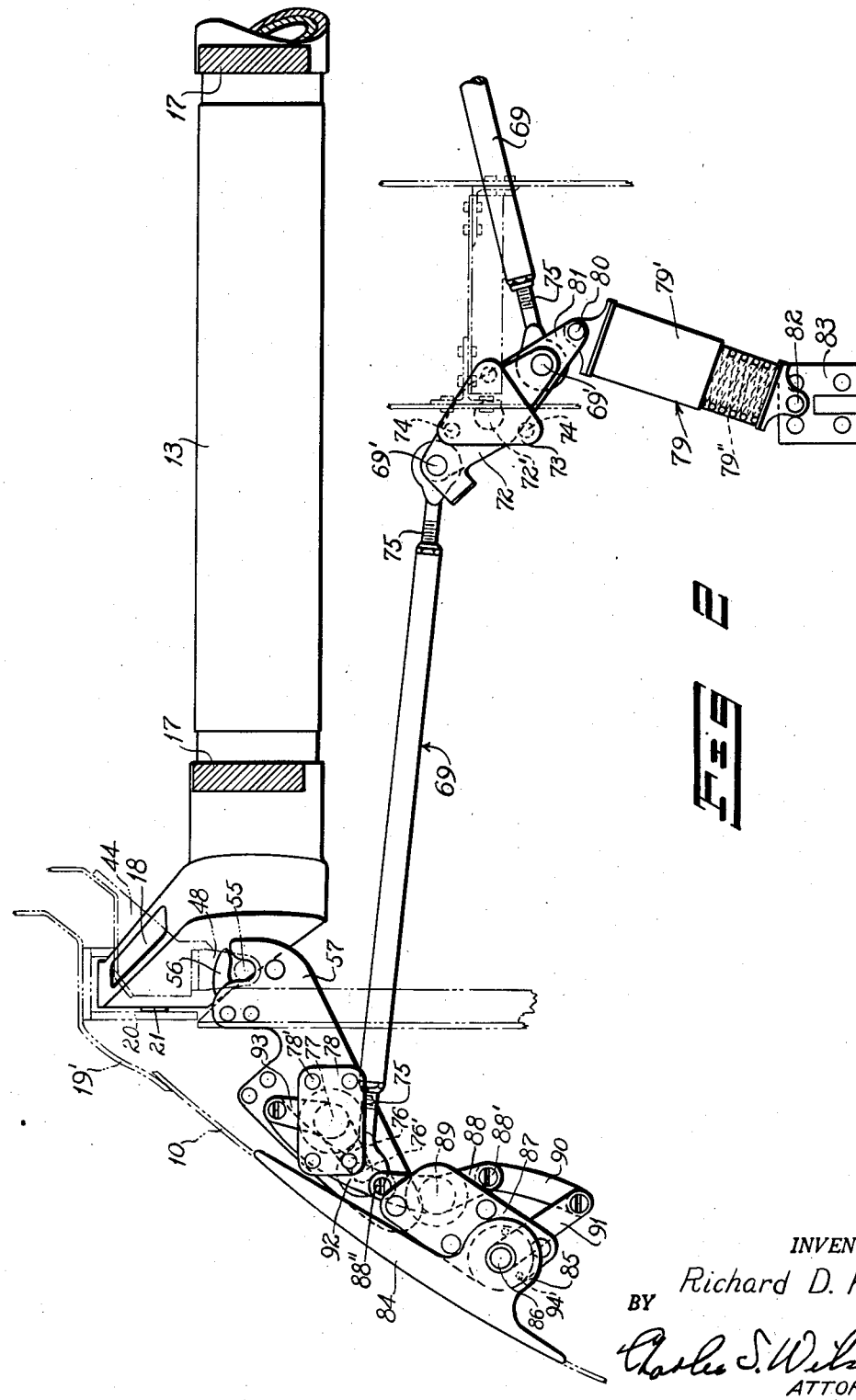

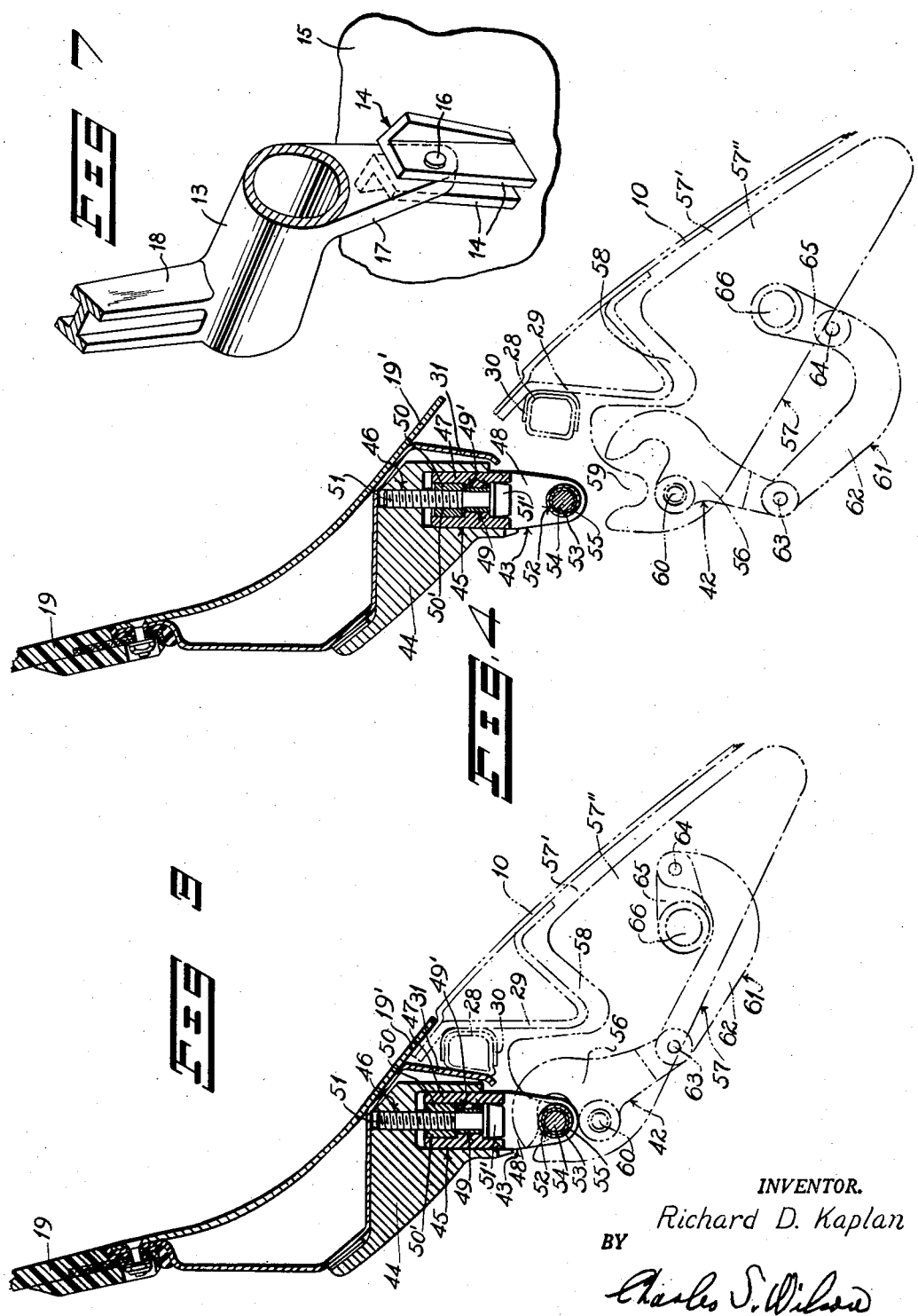

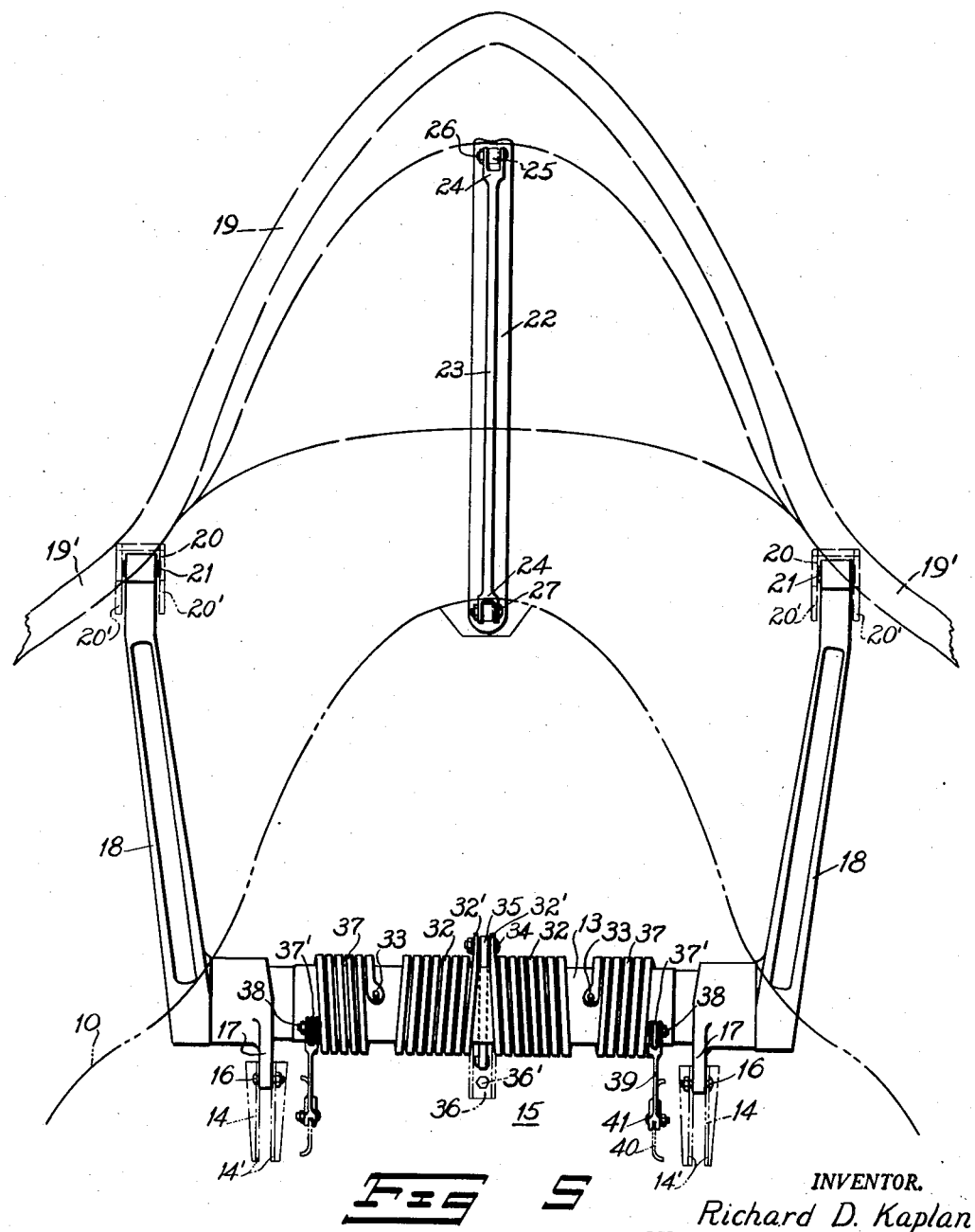

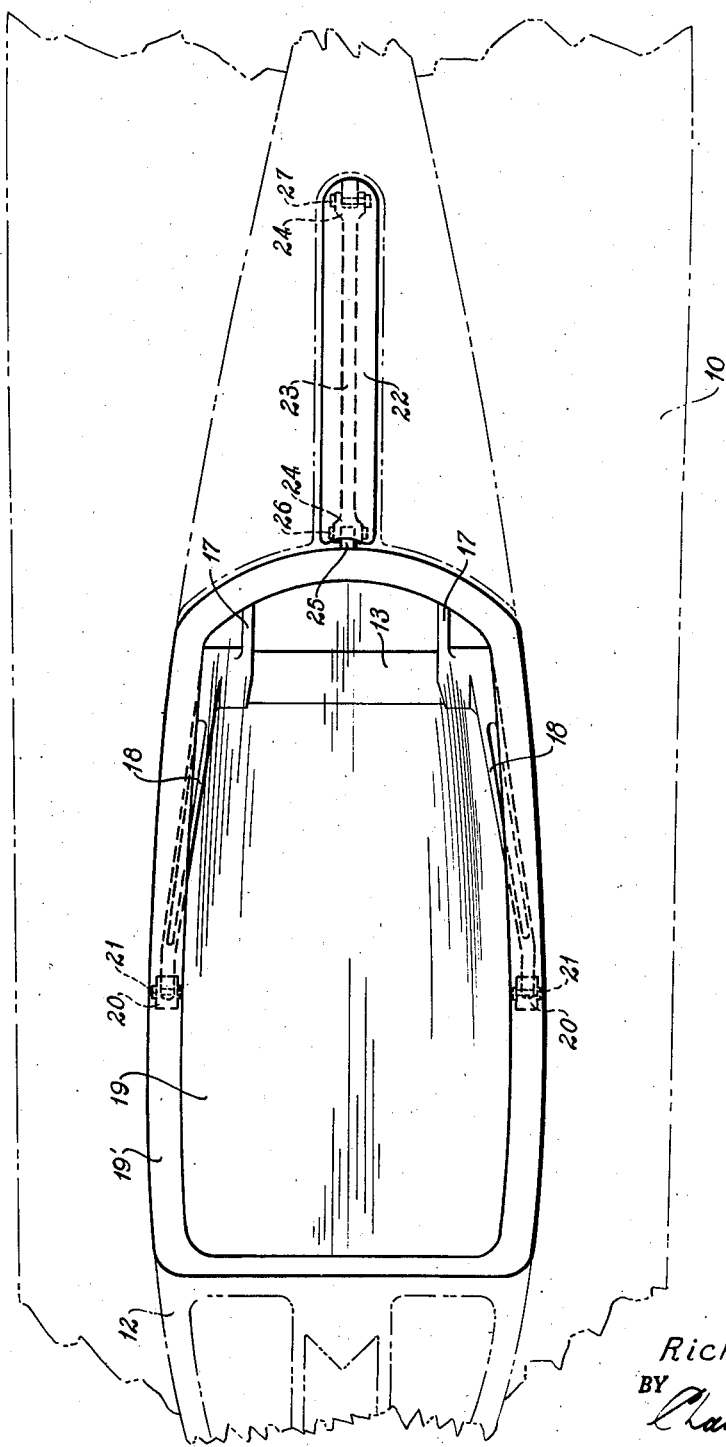

United States Patent Office 2,828,093
Patented Mar. 25, 1958

2,828,093

CANOPY MECHANISM

Richard D. Kaplan, East Meadow, N. Y., assignor to Republic Aviation Corporation, Farmingdale, N. Y., a corporation of Delaware Application February 10, 1954, Serial No. 409,298

12 Claims. (Cl. 244—121)

This invention relates to mounting the closure or canopy for the cockpit of an airplane and to a mechanism by which such canopy may swing or move relative to the fuselage to and from its position over or enclosing the cockpit. It is also concerned with the means associated with or interposed between the canopy and the fuselage by which the canopy is locked against movement relative to the fuselage when situated over or enclosing the cockpit.

Among its other objects, the instant invention proposes a mounting means for the canopy that not only provides for swinging the canopy longitudinally of the fuselage from one position to another, but which also guides the canopy and holds it to a fixed path of movement.

A further means, releasable from within and/or without the cockpit, is provided to immovably secure or lock the canopy to the fuselage when it is in its closed position over the cockpit.

In short, by use of the disclosure herein the canopy may be mounted on the fuselage for swinging fore and aft movement, i. e. movement longitudinally of the fuselage, and during such movement be restrained from any deflection or movement laterally of or transverse to the path of such longitudinal movement.

Moreover, the mounting and operating mechanism hereof insures an intimate contact or engagement between the edges of the canopy and the fuselage when the former is disposed over the cockpit and includes means for the release and instantaneous disconnection of the canopy from the airplane.

With the above and other objects in view, as will be apparent, this invention consists in the construction, combination and arrangement of parts all as hereinafter more fully described, claimed and illustrated in the accompanying drawings, wherein:

Fig. 2 is a transverse section taken along line 2—2 of Fig. 1 to show the means by which the components of the several locks employed for the releasable connection of the canopy to the fuselage when positioned over the cockpit may be operated simultaneously to free the canopy for reciprocation longitudinally of the fuselage;

Fig. 3 is a transverse section taken along line 3—3 of Fig. 1 to illustrate the manner in which the canopy is locked to the fuselage when in its closed position at each of several points of locking connection;

Fig. 4 is a view like that of Fig. 3 showing the operation of the lock to disconnect or release the canopy from the fuselage to permit the reciprocation thereof aftwardly along the fuselage to its open position;

Fig. 5 is a front elevation of the canopy and its operating mechanism to show the extended position thereof corresponding to the extreme open position of the canopy which, together with a fragmentary portion of the associated fuselage, is illustrated in phantom lines;

Figure 1:
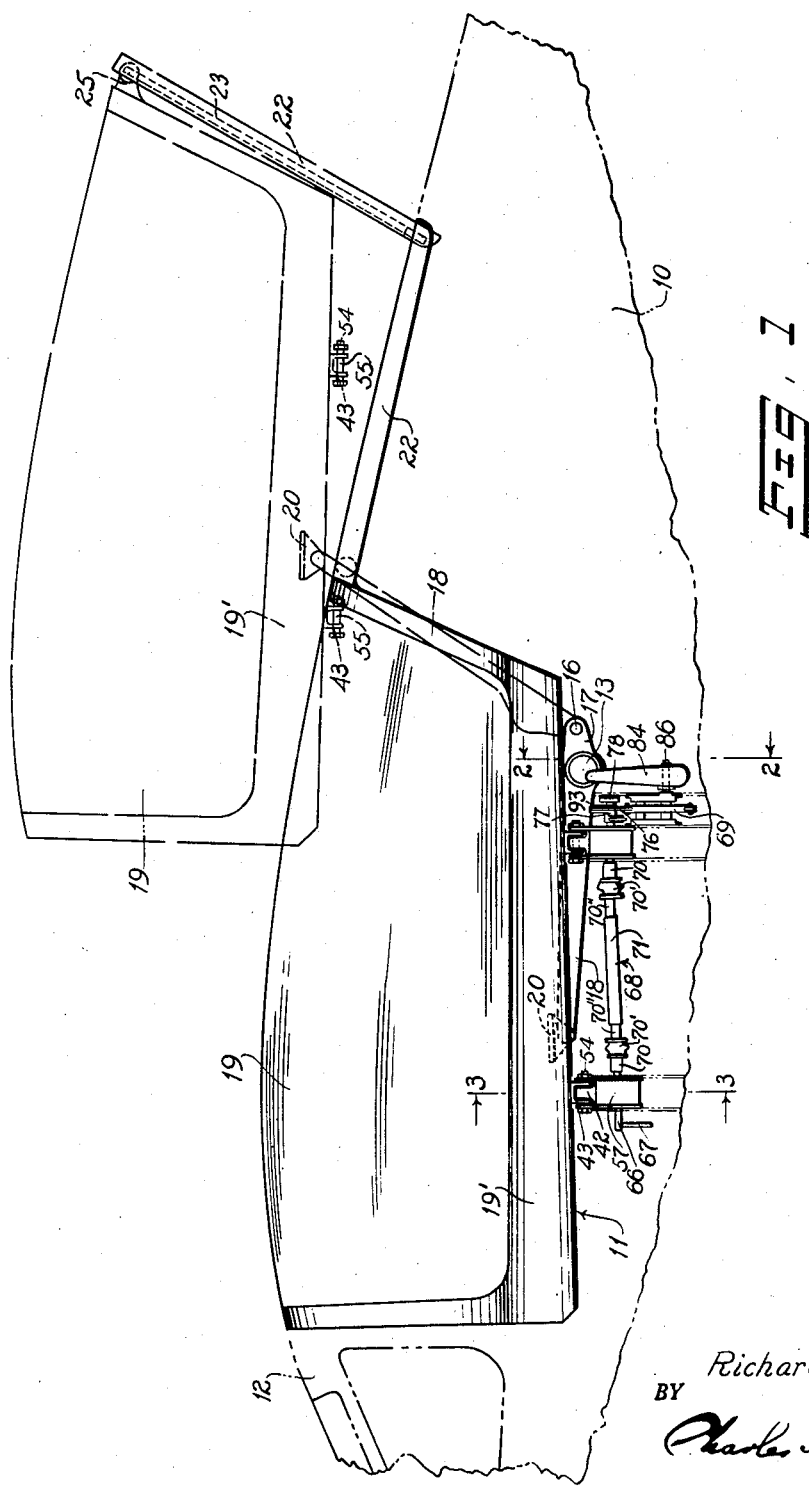
Fig. 1 is a side elevation of an airplane canopy equipped with the present mounting and operating mechanism and shows the closed position of the canopy in solid lines and its fully open position in broken lines, the associated airplane fuselage and windshield being fragmentarily illustrated in phantom lines.

Fig. 6 is a plan view of the present canopy with the associated portion of the fuselage in phantom lines to show the inter-relationship of the several components of the operating mechanism in the retracted position with the canopy overlying and enclosing the cockpit; and, Fig. 7 is a perspective view partly in section, of a fragment of the present operating mechanism and associated portion of the fuselage to show the pivotal connection therebetween.

Heretofore, reciprocating canopies, i. e. canopies which are mounted on the fuselage in association with the cockpit to slide or roll relative thereto and longitudinally thereof to and from the positions where it overlies and covers the cockpit, have become more or less standard on the so-called high speed aircraft. The reason for this is that it is always undesirable to have any component of the aircraft project into the airstream during flight where they could develop drag or resistance to the forward movement of the airplane. There is also a possibility that unless the canopy, when opened during flight, remains reasonably within the contour of the fuselage or windshield it might be torn from the fuselage by the airstream.

With the advent of jet airplanes and the high speeds attained thereby new problems arose which made the reciprocating type canopy not only objectionable but largely obsolete. Due to extremely high pressures developed at the increased speeds, it is practically impossible for a pilot to manually close or open the canopy in flight. Hence, if the reciprocating canopy is to be employed, heavy and complex power mechanisms must be used for the operation thereof. Such power mechanisms are of various types such as hydraulic jacks, electric motors etc. and all can, and often do, jam, stick, or otherwise fail to function. A failure or malfunction of the mechanism operating a reciprocating canopy may prove to be disastrous in an emergency by trapping the pilot in a critically damaged airplane that he should abandon.

It is the general practice of pilots of sonic or supersonic airplanes not to open the canopy during flight except in an emergency, i. e., when it becomes necessary for them to bail out and abandon the airplane. When the occasion arises for the pilot to bail out or abandon his airplane, time becomes a vital and controlling factor. Hence the canopy must be quickly and easily removed from its closed position enclosing the cockpit in order to give the pilot free and unobstructed means of egress from the cockpit. Moreover, it may be preferred to totally remove or jettison the canopy from the fuselage to not only insure open egress from the cockpit but to prevent the pilot from being struck by the canopy in leaving or jumping from the airplane.

It is toward the solution of these, as well as other problems, that the present invention is directed. A canopy mounting and operating mechanism is proposed hereby which will permit the bodily translation or oscillation of the canopy on and relative to the fuselage between its extreme positions i. e. where it is disposed over and encloses the cockpit or where it is positioned substantially over the fuselage aft or rearwardly of said cockpit. When the present canopy is opened during flight it will project into the airstream and be torn from the fuselage by air pressure thereby eliminating complicated jettisoning means. As an added precaution to insure the release of the canopy, special means operable by the pilot either under a separate control or incorporated into the present operating and locking mechanism may be employed to positively jettison the canopy. Such positive jettisoning means forms no part of this invention aside from the fact that the invention contemplates the possible employment of some such ejecting or jettisoning mechanism and has been arranged to locate the canopy above the fuselage to the rear of the cockpit prior to the operation of the ejecting or jettisoning means that may be used.

Referring more particularly to the drawings, 10 designates fragmentarily an airplane fuselage which has a cockpit 11 therein. Mounted on the fuselage 10 across the forward end of the cockpit 11 is a windshield 12, only a portion of which is shown in phantom lines. Neither the fuselage 10 nor the windshield 12 per se form any part of this invention but are used herein solely for purposes of reference to more clearly show and describe the subject canopy, its operating mechanism and its cooperation with the windshield and fuselage. Therefore, it may be said that the present invention may be employed in conjunction with any major airplane component such as a fuselage without departing from the scope hereof.

A torque tube 13 is mounted transversely of the cockpit 11 adjacent the aft end thereof on a pair of brackets 14 which are fixedly secured by any suitable means to the rear wall or bulkhead 15 of said cockpit 11. These brackets 14 are horizontally aligned one with the other and each consists of a pair of spaced members 14' for the reception and support therebetween of an arm 17 which is immovably connected to, and projects radially from, each end of the tube 13. A bolt or pin 16 is provided to pivotally mount the arm 17 between the members 14' of the bracket 14. Thus the torque tube 13 is pivotally mounted on the fuselage 10 for rotation relative to the pin or bolt 16.

The torque tube 13 extends transversely of the fuselage 10 and of the cockpit 11 and terminates at each end in an arm 18 which is so permanently and fixedly attached to the tube as to be integral with it and angularly extending therefrom in substantial opposition to the cranks 17. Therefore, the torque tube 13 and the arms 18 at its ends, in effect, combine to form an integral, rigid U-shaped frame, mounted for oscillation and also for bodily movement relative to the fuselage 10 by means of cranks 17 on their respective pivot members 16 adjacent the ends of the bight portion of the frame.

The arms 18 are identical one with the other and are each provided with an aperture or transverse hole near its free extremity for the pivotal attachment thereof to the cockpit cover or canopy 19. To this end the frame or skirt 19' of the canopy 19 is provided with a pair of transversely aligned brackets 20 which are fixedly secured one on either side of the skirt 19'. Each bracket 20 comprises a pair of spaced depending arms 20' which are so disposed as to lie in the plane of the arms 18 for the reception and engagement thereof. Each arm 18 is received between the depending arms 20' of the associated bracket 20 and is pivotally connected or hinged thereto by the bolts 21 which pierce brackets 20 and the apertures in the arms 18. Hence any bodily movement of the torque tube 13 relative to the bolts or pivots 16, as set forth above, will be imparted to, so as to effect a corresponding movement of, the canopy 19 i. e. a reciprocating movement of the canopy longitudinally of the fuselage 10.

At and along the top of the fuselage 10 beginning at the aft end of the cockpit 11 and extending rearwardly, a relatively narrow strip 22 is removed from the skin thereof. A rigid bar 23 is secured to the under or inner surface of the strip 22. This bar 23 terminates at each end in a bifurcation 24. The forward bifurcation 24 spans and embraces a lug 25 fixedly carried by and projecting from the aft end of the canopy 19 at the transverse center thereof to which it is pivotally connected by a pin 26. The opposite bifurcation 24 is similarly connected as at 27, to the fuselage 10 for pivotal movement. The length of the bar 23 is substantially equal to that of the arms 18 so that the longitudinal center line of the canopy 19 will remain in a virtually horizontal plane during the entire movement thereof between its extreme positions. Thus, the canopy may be swung bodily and elevated relative to the fuselage to and from a position enclosing the cockpit and a position vertically above and substantially aft of the cockpit.

The canopy 19 may be adapted to sealingly engage the fuselage 10 when enclosing the cockpit 11 and when so doing firmly abuts the rim of the windshield 12 and the edge of the fuselage 10 which defines the rear or aft end of the cockpit 11. At the same time the skirts 19' which extend along and border each side of the canopy 19 overlap and bear snugly against the sides of the fuselage 10. Thus the contour of the canopy 19 is such as to merge with the adjoining windshield 12 and fuselage 10 so as to form smooth continuations of the surfaces thereof in both the longitudinal and transverse plane and thereby maintain the streamline aerodynamic contour of the airplane.

In addition to the overlapping engagement of the skirts 19' with each side of the fuselage 10, this joint or junction between the canopy 19 and the fuselage 10 is further sealed when the canopy 19 is in its closed position by means of a rubber tube 28 (Fig. 4). This tube 28 is rectangular in cross-section and is secured to and along the inner edge of the sides of the fuselage 10 in any suitable manner, such, for example, as by a plate 29 and a U-channel 30. It is to be noted that the plate 29 is affixed to the inner surface of the side of the fuselage to rest substantially perpendicular. The U-channel 30 is immovably secured to the face of this bracket 29 with its open side facing inwardly of the cockpit 11. The tube 28 is seated in and fastened to the U-channel 30 with its unattached side extending somewhat beyond the limits of said U-channel 30 for the flush and sealing abutment with the surface of a perpendicular depending strip or band 31 fixed to and carried by the skirt or apron 19' of the canopy 19 when said canopy is disposed to enclose the cockpit.

In order to control the reciprocation of the canopy, i. e., move it from its open position aft of the cockpit to its closed position enclosing the cockpit counterbalancing means is employed in association with the torque tube 13. This counterbalancing means consists of a pair of helical coil springs 32 centrally disposed on the tube 13 each with one of their ends anchored to the tube. At their opposite or inner ends the springs 32 terminate at the center point in the length of the tube 13 in a pair of adjacent tips 32' having aligned holes therein for the passage of a connecting bolt 34. An arcuate link 35 curved to conform to the contour of the tube 13 and having an aperture at each of its ends is piovtally mounted at one end on the bolt 34 between tips 32' of the springs 32 and at its other end to a bracket 36 which is permanently secured to the bulkhead 15, as by the bolts 36'.

Also disposed on each end portion of the tube 13 between the springs 32 and the projecting links 17, are a pair of springs 37 similar to the springs 32. Each of the springs 37 are secured to the tube 13 at one end 33 while their opposite ends each terminates in a projecting fitting 37' which is provided with an opening for the reception of a bolt 38. A link 39 pivotally connects each fitting 37' of the springs 37 to the bulkhead or end wall 15 of the cockpit 11. For this purpose each link 39 is bifurcated at its opposite ends to receive and secure the fitting 37' at one of its ends by means of a bolt 38 and at its other end to engage and secure a bracket 40 fixedly secured to the wall or bulkhead 15 by means of a bolt 41.

The springs 37 are arranged in opposition to the springs 32 so as to counterbalance the assembly consisting of the tube 13, supporting arms 18 and the canopy 19 carried at the ends of said arms during its reciprocation. The purpose of this counterbalancing arrangement of springs is to supply opposed torque forces of sufficient magnitude to bear the weight of the canopy at all times. Hence, the pilot need apply only a force necessary to unbalance the opposite torque forces in order to move the canopy as desired.

By provision of the spring counterbalance the movement of the canopy assembly is assisted by the springs 32 and 37 at the initiation of such movement from either its fully closed position or its fully open position when the maximum force is required to move the assembly. At intermediate points in the path of movement of the canopy assembly where the force of gravity affects the movement of the canopy the springs variably act to retard the accelerated movement of the canopy assembly.

Since the canopy is to be maintained closed and secured against movement relative to the fuselage 10 during flight, locking means such as illustrated in Figs. 3 and 4 is provided. Preferably there are two of these locks interposed between the canopy 19 and the fuselage 10 on either side of the cockpit 11. Each lock comprises a latch device 42 mounted for operation on the fuselage 10 and a complementary catch or keeper 43 adjustably secured to the canopy 19 positioned to be in alignment with the latch when said canopy occupies its closed position.

To mount the catch or keeper 43 on the canopy, a block 44 is fixedly mounted on the inner side of the skirt 19' in any convenient manner. This block 44 is provided with a vertical passage or well 45, preferably circular in cross-section, in its bottom face and an internally threaded bolt hole 46 is centrally disposed in the end wall of this passage or well 45.

The catch or keeper 43 comprises a stud 47 to be received in the passage or well 45 and a pair of integral, projecting ears 48 extending in opposition to the stud 47 and equally disposed on opposed sides of the longitudinal axis thereof. The stud 47 is provided with a central bore 49 for the reception therein of an internally threaded bushing 50 through which a bolt 51 passes for threaded engagement with the bolt hole 46. It is to be noted that the bore 49 is of greater diameter at its ends than at its central portion to thereby create a central shoulder 49' on one side of which an oversize inner end 50' of the bushing 50 rests. The other side or face of the shoulder 49' serves as a seat for the head 51' of bolt 51 when in its operative position. The position of the catch or keeper 43 to the block 44 is regulated within limits by the adjustment of the bolt 51 relative to the hole 46.

Adjacent the outer ends of the ears 48 are provided apertures 52 which align one with the other. A cylindrical bushing 53 extends between the ears 48 and is press-fitted at its ends into the adjacent apertures 52. This bushing affords a passage for the bolt 54 which extends between the ears 48 and may be tightened to prevent its movement within the bushing 53. On that part of the bushing 52 disposed between the ears 48 of the catch or keeper 43, is mounted a sleeve 55 which abuts the opposed inner faces of the ears 48 at its ends so as to maintain the spacing of said ears. At the same time this sleeve 55 cooperates with the latch 42 carried on the fuselage 10 to facilitate the operation of the latch for the positive connection of the canopy 19 to the fuselage or its release from the fuselage.

The latch mechanism 42 consists of a hook 56 pivoted to the fuselage to swing to and from positions of engagement and disengagement of the catch or keeper 43 and particularly the sleeve or cross member 55 thereof. Mounting of the hook 56 on the side wall of the fuselage 10 is accomplished through, and by means of, a bracket 57. This bracket 57 is generally U-shaped in section, the base 57' being curved to conform to the contour of the fuselage 10 against which it abuts and to which it is bolted or otherwise secured. At and along its upper end the outer face of the bracket 58 is offset and grooved to circumvent and abut the inner face of the projecting adjoining bracket 29. The sides 57" of the U-shaped bracket 57 are spaced one from the other a distance substantially equal to the overall distance between the spaced ears 48 of the catch 43. Hence, when the canopy 19 is closed, the catch 43 is seated within the U-shaped bracket 57 and is disposed between the sides 57" thereof.

Since the head and nut on opposed ends of the bolt 54 extend beyond the limits of the respective ears 48, a saddle or recess 59 is provided at the outer end of each side 57" of the U-bracket 57 to receive and seat the bolt extremities. The hook 56 works in opposition to the recesses 59, being on a pivot or bolt 60 fixed between sides 57" of bracket 57 so as to engage over and hold the cross member 55, when the canopy is closed as aforesaid.

The operation of the hook 56 for the engagement and/or disengagement of the catch or keeper 43 on the canopy 19 is manually effected by the pilot through a toggle assembly, generally designated 61. This toggle assembly 61 comprises a link 62 pivotally connected at one extremity to the end of hook 56 opposed to the catch-engaging end by a pin or bolt 63. It is similarly connected at 64 at its other extremity to an arm 65 fixed to, and projecting radially from, a shaft 66. The link 62 is curved or bowed medially of its length whereby the end portions of the link are disposed at substantially right angles to each other. The overall composite length of the link 62 and ear 65 is such that when the hook 56 engages the catch 43 the curved portion of the link 62 partially encircles and accommodates the shaft 66 to the end that the axes of pivots 63 and 64 lie on substantially a straight line in a plane somewhat above the axis of the shaft 66 (Fig. 3). At all times the axis of the pivot 60 of the hook 56 is disposed to one side of the longitudinal center of said hook. Hence, it is apparent that any up-load or force applied to the canopy 19 while it is locked to the fuselage will tend to tighten or load the latch mechanism 42 in direct opposition to the up-load.

When, however, it is desired to release the latch mechanism 42 and thereby release the canopy 19 for movement relative to the fuselage 10, the pilot rotates the shaft 66 by means of and through an operating handle 67 (Fig. 1) fixed to and projecting radially from said shaft and located on one side of the cockpit 11. Manifestly, clockwise rotation (Fig. 3) of the shaft 66 breaks the toggle 61 and moves the pivots 63 and 64 of link 62 to a position below the axis of the shaft 66 causing a corresponding clockwise rotation of the hook 56 whereby said hook is disengaged from the catch or keeper 43. The elements 56, 57 and 65 of the latch assembly then assume the positions shown in Fig. 3. Reversely the counterclockwise rotation of the rod 66 moves these elements from their respective positions illustrated in Fig. 4 to the positions thereof shown in Fig. 3 where the hook 56 engages the catch or keeper 43 and locks the canopy 19 to the fuselage 10.

The foregoing description of the construction and operation of the locking mechanism operable between the canopy 19 and the fuselage 10 is in terms of a single unit. Two or more of these units may be employed on each side of the cockpit 11 where they are relatively spaced longitudinally of the cockpit.

To the end that all of these locking units may be operated simultaneously for the complete release of the canopy 19, or for completely locking of the canopy to the fuselage a linkage is provided in the cockpit and is operatively associated with all of the locking units regardless of their number. This linkage includes an extension shaft 68 interposed between the shafts 66 of adjacent latch mechanisms 42 to directly connect the locking units disposed on the same side of the cockpit 11 and a pair of operating rods 69 which transmit the rotary movement of the shafts 66 of the locking units on one side of the cockpit 11 to the shafts 66 of the locking units on the other side of the cockpit.

Extension shaft 68 is an extension of the shaft 66 adjoining its ends and disposed between the locking connections on one side of the cockpit 11 for that purpose. At each extremity of the extension shaft 68 is provided a sleeve 70 for telescopic reception of a shaft 66 of the associated latch mechanism 42 at one of its ends. The shaft 66 is then secured within the sleeve 70 by any suitable means. The sleeve 70 consists of two parts having a pivotal connection 70' between them thereby providing a universal connection between the sleeve components at a point medially of the total length of the sleeve. The inner end of each sleeve has a stud 70" to be received telescopically in a tube 71 which comprises the major portion of the extension shaft 68. Thus the extension shaft 68 slideably and adjustably cooperates at its ends with the coupling or sleeve unit 70 and is there fixedly secured for rotation in unison with the shafts 66 of locking units disposed adjacent each of its ends. This arrangement and construction compensates for any misalignment of the locking connections, due in part to the curvature of the fuselage 10 and in part to variations in installation and mounting of the several locking units.

A pair of operating rods 69 extend transversely across the rear of the cockpit 11 adjacent the end wall or bulkhead 15 and the ends thereof are pivotally connected to the ends of bellcrank lever 72 which in turn is pivoted centrally of its length to the bulkhead 15. To accomplish this the bellcrank 72 has a central hole for the reception and passage of a fixed pivot 72'. The pivot 72' is integral with, and projects laterally from, a mounting plate 73 which is fixedly secured to the bulkhead 15 as at 74. At its opposed ends the bellcrank 72 is bifurcated to pivotally receive one extremity of each operating rod 69 as at 69'. The other extremity of each rod 66 is connected in a manner to be described to the shaft 66 of latch mechanisms 42 disposed on opposite sides of the cockpit 11 in alignment with the rods 69. Each rod 69 is provided with a connection 75 threaded to the rod whereby the length of the rod may be adjusted to compensate for variations in installation.

The connection of each rod 69 to the shaft 66 of the latch mechanism is effected through a lever arm 76. This lever 76 is secured to the shaft 66 so as to project radially therefrom and pivotally engage the end of the rod 69 by means of and through a pivot 76'. It is to be noted that the extremity of the shaft 66 terminates in a journal 77 which is centrally mounted on a supporting plate 78 affixed to the rear bulkhead 15 by the means 78'.

It is apparent that the rotation of the handle 67 by the pilot or operator not only effects the simultaneous operation of each hook 56 with respect to its companion catch 43 on one side of the cockpit, but also effects the simultaneous operation of each hook on the opposite side of the cockpit by the rotation of lever 76 through the rods 69. Similarly the rotation of the levers 76 on one side of the cockpit is imparted to the levers 76 on the other side of cockpit 11 for simultaneous operation of the hooks 56 on that side of the cockpit by and through the operating rods 69. Hence the operation of one control (handle 67) operates all of the locking units on one side of the cockpit by means of the extension shafts 68 and simultaneously operates the locking units on the opposite side of the cockpit by means of their extension shafts 68 in conjunction with the operating rods 69. In short the shafts 66 on each side of the cockpit are interconnected for operation in unison by the extension shafts 69 and the shafts 66 of the several locking units on one side are connected for simultaneous operation with the shafts 66 of the units on the opposite side of the cockpit by the operating rods.

In order to maintain the locked or unlocked condition of the hooks 56 once either of these positions has been established, resilient retention means 79 is provided in association with the bellcrank lever 72 to impose a constant urge on said bellcrank lever in the direction it was last moved. This retention means 79 consists of a pair of cylinders 79' open at their adjoining ends and telescopically fitted one within the other. A compression spring 79" having a diameter substantially equal to the internal diameter of the inner cylinder 79' is disposed within the joined cylinders 79' to impose a force thereon tending to separate the cylinders and extend the length of of the unit. The outer end of the external or larger cylinder 79' is pivotally secured by a bolt or pin 80 to an integral projection 81 on one end of the bellcrank 72, while the internal or smaller cylinder 79' is similarly secured by a pin 82 at its outer end to a supporting plate 83 fixedly attached to the bulkhead 15.

The bellcrank lever 72 is so organized and arranged with the rods 69 that the pivots 69' thereof are equidistantly disposed on opposite sides of the axis of its pivot 72' and in the extreme positions of said bellcrank correspond to the fully locked and fully unlocked positions of the hooks 56. The fixed pivot 82 of the retention unit 79 is vertically disposed directly below the pivot 72' of the bellcrank lever. Hence, an actuating force is required to overcome and compress the spring 79" in order to rotate the bellcrank lever 72 and the projection 81 with it from one side to the other of the line of the pivots 72' and 82. In this way the retention means 79 serves to lock the latch mechanims 42 in both their open and closed positions.

In addition to the above-described mechanism for locking and/or unlocking the canopy 19 to the fuselage 10 which obviously is operable only from within the cockpit 11, an external operating control is desirable to complete the mechanism. For this purpose an external handle 84 (Fig. 2) is so mounted in the outer wall or skin of the fuselage 10 that is normally flush with the skin so as not to interrupt or break the smooth, aerodynamic contour of the surface of the fuselage. This handle or lever 84 is positioned adjacent the aft end of the cockpit 11 and is provided with an integral lobe 85 which projects from its inner face near the bottom thereof. The lobe 85 pierces the fuselage 10 through an aperture provided for that purpose and is pivotally mounted on a bolt or pin 86 secured to and projecting laterally from a fixed rectangular plate 87 forming a part of the aircraft structure.

The handle 84 is connected to one of the locking and/or unlocking units by and through a linkage which operatively joins it with the shaft 66. This linkage is employed for two purposes; one, to obtain a mechanical advantage incident to the use of a lever arm; and two, to allow the handle 84 an initial amount of lost motion relative to shaft 66 for the withdrawal of said handle from its housing in the fuselage skin so that it may be grasped.

The aforesaid linkage consists of two articulate sections directly interconnected through an intermediate bellcrank 88 which is pivotally mounted on the pin 89 carried by the fixed plate 87 adjacent the end thereof remote from the pivot pin 86. A link 90, pivotally connected at one of its ends to one arm 88' of the bellcrank 88 and at its other end to the free end of a crank arm 91 secured to the pin 86 adjacent the handle 84, constitutes the lower section of this linkage system. A similar link 92 connected at its opposed ends to the other arm 88" of the bellcrank 88 and to a crank 93 fixed to and projecting radially from the shaft 66 constitutes the upper section of the linkage system.

The operation or actuation of the linkage rotates the shaft 66 in the same manner as the handle 67 to simultaneously lock and/or unlock the several locking units by which the canopy 19 is secured to fuselage 10. A pair of stops or abutments 94 are provided for cooperation with the handle 84 and the crank 91. These stops 94 are fixed to the lobe 85 of handle 84 in spaced relationship one to the other and on opposite sides of the crank 91 so as to project at right angles from the face of the lobe into the path of the crank 91 upon the movement of said handle about the pivot pin 86.

The lost motion of the handle 84 with respect to the shaft 66 is accomplished by positioning the stops or abutments 94 a predetermined distance from each side of the crank 91. Thus upon the initial movement of the handle 84, for example through 15°, neither stop 94 will contact the crank 91. However, after completion of this initial movement one or the other of the stops 94 will contact the crank 91 whereupon continued movement of the handle will operate the linkage to rotate the connected shaft 66 and thereby lock or unlock the associated hooks 56.

Considering Fig. 2 which discloses the canopy 19 in the locked position, a pull on the handle 84 will rotate the lower stop 94 counterclockwise about the pin 86 until it abuts the lower edge of crank 91. At this point the outer end of the handle 84 has been removed from a position flush with the skin of the fuselage 10 to allow the operator to grasp it for the application of sufficient force to actuate the linkage. The continued movement of the handle 84 will swing the crank 91 in a counterclockwise direction about the pin 86. The intermediate bellcrank 88 is thereby moved in the same direction about its pivot 89 causing an equal and similar movement of the arm 93 for rotation of the shaft 66 in the direction that disengages the hook 56 of the coacting locking unit in the same manner as the handle 67 within the cockpit. Since the shaft 66 of one locking unit controls or effects the simultaneous operation of the hooks 56 of all locking units to and/or from their associated and complementary catches 43 it becomes manifest that operation of the handle 84 will likewise operate the hooks of all locking units effectively interposed between the canopy 19 and fuselage 10.

What is claimed is:

1. In an airplane the combination with the fuselage having a cockpit, of a canopy to overlie and enclose said cockpit, a plurality of spaced latches mounted on the fuselage at and along the edges of the cockpit, a plurality of spaced catches fixedly secured along the corresponding edges of the canopy, one catch aligning with and complementary to each latch when the canopy overlies and encloses the cockpit, connections between all of said latches for actuating them in unison to engage or release their respective catches, a torque rod mounted on the fuselage, and a pair of arms interposed between the canopy and the fuselage each fixed at one end to an extremity of the torque rod and at its opposite end pivoted to the canopy.

2. In an airplane the combination with the fuselage having a cockpit, of a canopy to overlie and enclose said cockpit, a plurality of spaced latches mounted on the fuselage at and along the edges of the cockpit, a plurality of spaced catches fixedly secured along the corresponding edges of the canopy, one catch aligning with and complementary to each latch when the canopy overlies and encloses the cockpit, connections between all of said latches for actuating them in unison to engage or release their respective catches, a torque rod mounted on the fuselage for both rotary and limited bodily movement, a pair of arms interposed between the canopy and the fuselage each fixed at one end to an extremity of the torque rod and at its opposite end pivoted to the canopy, and an auxiliary arm pivoted at one end centrally of the fuselage and at its opposite end centrally of the canopy, the fuselage being provided adjacent the pivotal connection of the auxiliary arm with a longitudinal recess to receive and house said auxiliary arm when the canopy overlies and encloses the cockpit.

3. In an airplane the combination with a fuselage having a cockpit, of a canopy to cover and enclose said cockpit, a series of oscillatory shafts, each carrying a latch, situated on each side of the cockpit, a series of catches fixed to each side of the canopy, each catch being complementary to one of said latches when the canopy covers and encloses the cockpit, extension shafts on each side of the cockpit disposed between and connected to the oscillatory shafts carrying latches on that side of the cockpit for the simultaneous operation of said oscillatory shafts and the latches carried thereby, means operable from within the cockpit for controlling the movement of the oscillatory and extension shafts on one side of the cockpit whereby the associated latches engage or release their complementary catches, a handle mounted externally of the cockpit and connected to the oscillatory and extension shafts on one side of the cockpit for the actuation of said shafts to cause the latches on that side of the cockpit to simultaneously engage or release their respective complementary catches, links disposed between the oscillatory and extension shafts on one side of the cockpit and those on the opposite side of the cockpit, each link being eccentrically connected at its outer end to one of the aforesaid shafts and said links having their inner ends disposed at the approximate center of the rear wall of the cockpit, a bellcrank lever pivoted to the rear wall of the cockpit having each of its arms pivoted to the inner end of one of said links whereby the oscillation of the shafts on one side of the cockpit correspondingly moves one of said links and the attached bellcrank to cause similar oscillation of the shafts on the other side of the cockpit by means of the other of said links, means connected to said bellcrank to counteract its initial movement from either of its extreme positions, and means for mounting the canopy on the fuselage to swing between a position covering and enclosing the cockpit and a position above and spaced from the fuselage aft of the cockpit.

4. In an airplane the combination with a fuselage having a cockpit, of a canopy for said cockpit, an assembly for mounting the canopy for movement longitudinally of the fuselage comprising a pair of mounting arms pivotally secured to the fuselage at the aft end of the cockpit and disposed in transverse alignment one with the other, said arms being pivotally connected at their free ends to the canopy approximately medially of its length, and a single arm substantially equal in length to said mounting arms pivotally secured at one end to the fuselage aft of the cockpit and pivotally connected at its opposite end to the aft end of the canopy.

5. In an airplane the combination with a fuselage having a cockpit, of a canopy for said cockpit, and a unitary assembly for mounting the canopy for swinging movement longitudinally of the fuselage comprising a torque rod, a crank disposed adjacent and attached to each end of said rod for the pivotal attachment thereof to the fuselage, an arm fixed to and projecting radially from each end of said torque rod to constitute a rigid mounting assembly in combination with said rod, pivotal connections between the ends of said arms and the opposed sides of the canopy, opposed counterbalancing springs encircling said rod each having one end secured to the rod and its other end secured to the end wall of the cockpit, and an auxiliary arm pivoted at its ends to the fuselage aft of the cockpit and to the aft end of the canopy.

6. In an airplane the combination with a fuselage having a cockpit, of a torque rod mounted on the fuselage at the aft end of the cockpit, a canopy to cover and close said cockpit, a pair of mounting arms fixed to the ends of said torque rod and disposed in alignment one with the other transversely of the fuselage, said arms being pivotally connected to the canopy medially of its length at the ends thereof remote from the rod, an auxiliary arm substantially equal in length to said arms pivotally secured at one end to the fuselage aft of the cockpit and pivotally connected at the other end to the aft end of the canopy, and at least two coil springs encircling the torque rod, each of said springs being secured at its opposed ends to the rod and to the fuselage and being wound equally and reversely one with respect to the other.

7. In an airplane the combination with a fuselage having a cockpit and a removable canopy to cover and enclose said cockpit, of a mounting assembly for said canopy on the fuselage for swinging movement between a position enclosing and covering the cockpit and a position over and spaced from the fuselage substantially aft of the cockpit comprising a transverse rod mounted at the aft end of the cockpit for rotary and bodily movement, an arm fixed to and projecting at right angles to each end of said rod, a connection between the outer end of each of said arms and the canopy, a rigid link hinged to the fuselage at one end and pivotally connected to the approximate center of the end of the canopy at its opposite end, and counterbalance means associated with said rod organized and arranged to assist in moving the canopy from a static position at each end of its path of movement and to retard its movement after it has moved from either of its static positions.

8. In an airplane the combination with a fuselage having a cockpit therein, of a canopy for said cockpit, a U-shaped frame pivotally connected at its bight end to the fuselage and at the ends of its arms to the canopy medially of its length, and a guide and supporting arm pivotally connected to the aft end of the canopy and to the fuselage, said arm coacting with said frame for bodily swinging and elevating the canopy relative to the fuselage from a position enclosing the cockpit to a position vertically above and substantially aft of said cockpit.

9. In an airplane the combination with a fuselage having a cockpit therein, of a canopy to normally enclose and cover said cockpit, a frame comprising a pair of interconnected actuating arms pivoted at corresponding ends to the fuselage at the aft end of the cockpit, the other ends of said arms being pivoted to the canopy medially of the length of said canopy, a single guide arm pivotally connected at one of its ends to the aft end of the canopy and at its other end to the fuselage aft of the cockpit, said frame and arm guiding and displacing said canopy from its normal position enclosing the cockpit to a position above and spaced from the fuselage substantially aft of said cockpit, and locking means securing the canopy to the fuselage when in its normal position.

10. In an airplane the combination with a fuselage having a cockpit therein, of a canopy for said cockpit organized and arranged to merge with the surface of the fuselage when in its operative position enclosing the cockpit, locking means securing the canopy to the fuselage when in its operative position, releasing means connected to said locking means, a frame, means pivotally connecting the frame to the fuselage and to the canopy, said means including a plurality of mounts complemental to said connecting means fixedly secured to the fuselage adjacent the aft end of the cockpit and to the canopy medially of its length to pivotally engage said connecting means, and a rigid link hinged to the fuselage and to the end of the canopy at the approximate center thereof, the frame and link cooperating in the support and mounting of the canopy to the fuselage for movement longitudinally of the fuselage to a position over and spaced from the fuselage aft of the cockpit upon the operation of said releasing means and thereby disposed in the airstream.

11. In an airplane the combination with a fuselage having a cockpit, of a canopy to enclose and cover said cockpit, a series of spaced, depending catches secured to the canopy at and along the edge thereof, upstanding latches mounted on the fuselage one in alignment with and complementary to each catch when the canopy encloses and covers the cockpit for coaction with the associated catch to secure the canopy against movement relative to the fuselage, interconnecting linkage joining the several latches one to the other for unitary operation thereof to release the latches from their respective catches to free the canopy, said linkage being operable both from within the cockpit and from the exterior of the fuselage, U-shaped mounting frame pivotally connected at the outer ends of its arms to the forward portion of the canopy and at its bight end to the fuselage at the aft end of the cockpit and operable upon the operation of said linkage to move the canopy longitudinally of and in an arc relative to the fuselage to a position above and aft of the cockpit and into the airstream, and guide means operable between the fuselage and canopy to maintain said canopy substantially parallelly disposed with reference to said fuselage during said movement.

12. In an airplane the combination with a fuselage having a cockpit, of a canopy to normally overlie and enclose said cockpit, locking means between the canopy and fuselage to secure the canopy in its normal position, disengaging means connected to said locking means, a counterbalanced mounting frame pivotally connected to the canopy medially thereof and to the fuselage adjacent the aft end of the cockpit, and a rigid bar pivotally connected at its ends to the end of the canopy and to the fuselage, said frame and bar cooperating in the mounting of the canopy to the fuselage for movement in an arcuate path with reference to the fuselage to a position above and aft of the cockpit whereby the longitudinal centerline of the canopy remains substantially parallel to that of the fuselage throughout said movement.

References Cited in the file of this patent

UNITED STATES PATENTS

| | | |
|---|---|---|
| 1,831,588 | Clark | Nov. 10, 1931 |
| 2,385,493 | Bowers | Sept. 25, 1945 |
| 2,424,834 | Lobelle | July 29, 1947 |
| 2,444,114 | Pevney | June 29, 1948 |
| 2,445,438 | King | July 20, 1948 |
| 2,479,713 | Beach | Aug. 23, 1949 |
| 2,484,919 | Westcott | Oct. 18, 1949 |
| 2,494,367 | Steele et al. | Jan. 10, 1950 |
| 2,591,913 | Bowers et al. | Apr. 8, 1952 |
| 2,673,050 | Patch et al. | Mar. 23, 1954 |

FOREIGN PATENTS

| | | |
|---|---|---|
| 267,973 | Great Britain | Dec. 29, 1927 |
| 467,153 | Great Britain | June 7, 1937 |
| 671,540 | Germany | Feb. 9, 1939 |

OTHER REFERENCES

"Flight" Magazine; Feb. 11, 1943; page 153.